United States Patent

[11] 3,579,865

| [72] | Inventor | Norman Kenneth Walker |
| | | 6613 Sulky Lane, Rockville, Md. 20852 |
| [21] | Appl. No. | 802,977 |
| [22] | Filed | Feb. 27, 1969 |
| [45] | Patented | May 25, 1971 |

[54] METHOD FOR MEASURING THE EFFECTS OF STRESS ON A MAN'S PERFORMANCE OF PRIMARY AND SECONDARY TASKS
8 Claims, 1 Drawing Fig.

| [52] | U.S. Cl. | 35/22 |
| [51] | Int. Cl. | G09b 19/00 |
| [50] | Field of Search | 35/22, 12 (D); 128/2, 76.5 |

[56] References Cited
UNITED STATES PATENTS

| 2,023,488 | 12/1935 | Poppen | 35/22X |
| 2,341,678 | 2/1944 | Wickes | 35/22X |
| 3,357,115 | 12/1967 | Kelley | 35/22 |

*Primary Examiner*—Wm. H. Grieb
*Attorney*—Sughrue, Rothwell, Mion, Zinn and Macpeak ABSTRACT: A method for measuring the effects of stress on a man's performance of a primary task, while a secondary task is also provided to be performed simultaneously by the test subject. The secondary task thus produces a "distraction stress" on the test subject thereby degrading his performance on both of the tasks. A Zero Input Tracking Analyzer (ZITA) is used as the primary task, which provides a unique tracking task that has no initial input or error source, and requires the test subject to null only his own error from his previous response after he has initiated the tracking task with his initial response. A number of variations, such as velocities and accelerations, as well as various amounts of lag or lead may be introduced into the response system. An Auditory Discrimination Task (ADT) can be used as the secondary task, to produce the "distraction stress" for the test subject while he is carrying out the primary task. This task requires that the test subject respond to the stimuli of high or low tones, presented to him by head phones, by moving a response stick forward or backward for the high and low pitch, respectively. A common display/recorder is used to record the performance on both tasks.

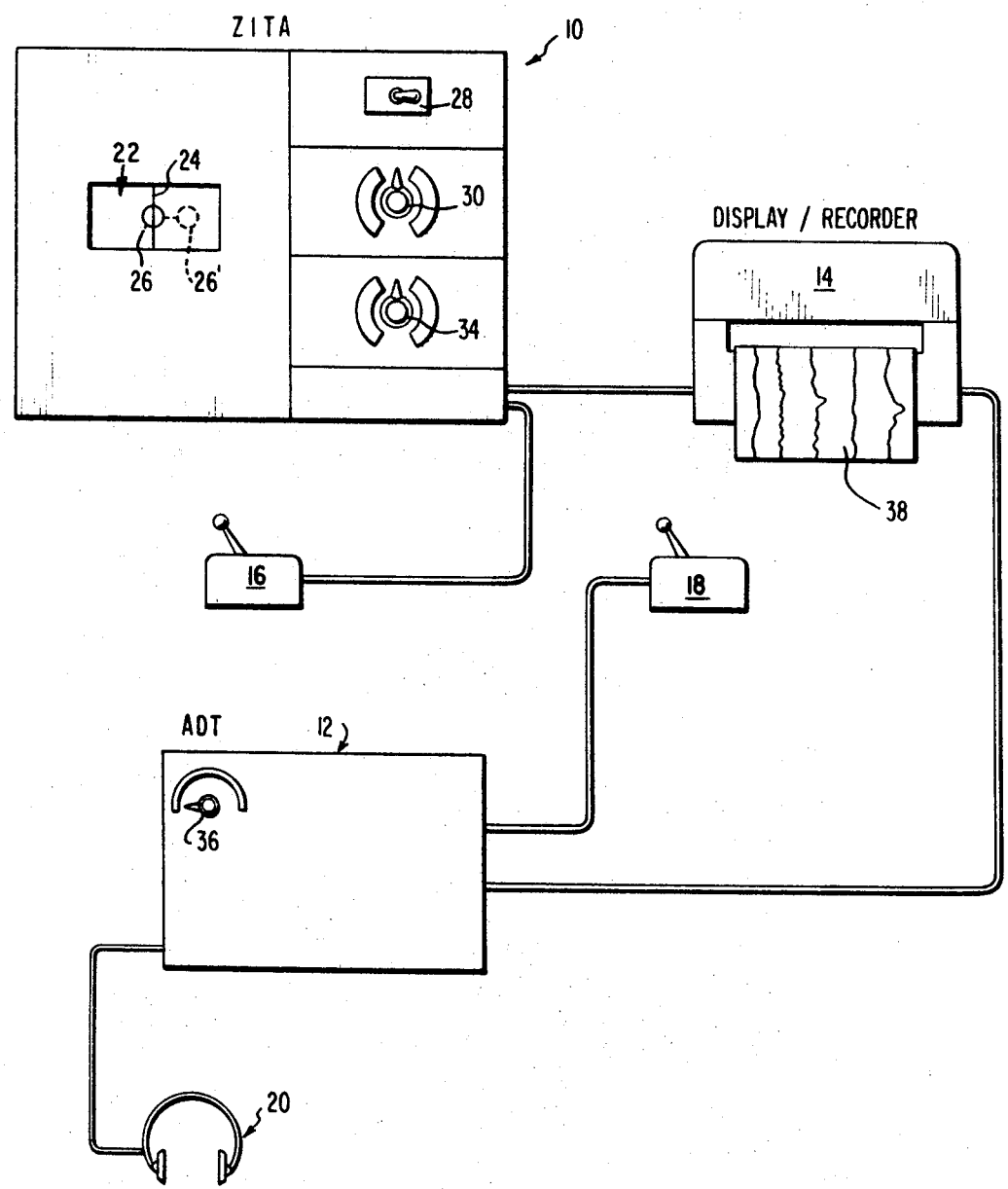

METHOD FOR MEASURING THE EFFECTS OF STRESS ON A MAN'S PERFORMANCE OF PRIMARY AND SECONDARY TASKS

BACKGROUND OF THE INVENTION

1. Field of the Invention

This invention relates to improvements in psychologic testing methods, whereby the effects of task induced stress on human performance can be determined to aid in personnel selection and training. Zero Input Tracking Analyzer, hereinafter referred to as ZITA, is used as the primary task which presents a complex tracking task that requires visual and manual coordination. The primary task can be tailored by introducing time lag or lead, acceleration control or other variables to alter the response of the display device to the test subjects movement of the control stick. The primary task can then be made difficult enough so that the effects of stress can be easily detected. A secondary or "distraction stress" may then be introduced which requires the test subject to listen to the auditory sound and respond manually thereto. Thus, each hand of the test subject is responding to a separate task and the effect of the secondary task on the performance of the first task can be compared.

2. Description of the Prior Art

Tracking tasks have often been used to measure the effects of task induced stress on human performance. Published studies, which are typical of the type of work which has been done in this area, show the movements of a spot of light being governed by a complex wave input. After being trained on the tracking task using his right hand, a subject then tracked the moving spot of light using various incompatible psychomotor control systems. This produced serious degradations in tracking performance and the cause was attributed to "task-induced stress." Since an individual's performance was variable, the results were issued in arbitrary and undefined units; consequently, they cannot be correlated with other tracking studies. The variability of such results are probably a function of the type of tracking tasks used.

The most common tracking tasks are pursuit and compensatory procedures which exhibit an initial error disturbance or internal source of error.

In pursuit tracking, the subject is shown a target, which in a one dimensional task might be a colored spot of light. He is instructed to hold his indicator, which might be represented by another colored spot of light, as closely as possible to the target spot by manipulating his control. Any desired type of control system can be interposed between his control stick and the indicator. In early work of this type, the target spot was moved suddenly from one point to another and the subject's response with the indicator was studied. The error score was the transient difference in the position of the target and the indicator. Sine wave motions of the target were then studied, and these were later replaced by complex sine waves or random noise inputs. If it was found that the subject did not respond, the error was equal to the input. If the subject responded perfectly, the indicator and target would coincide, and move together in space relative to the display panel. Note that it is possible to imagine perfect performance as being attainable by anticipating the required control signals.

In compensatory tracking the subject is shown only one spot, the indicator, and is told to hold this as nearly as possible on a fiducial marker or zero, which does not move. The disturbing inputs are applied to the indicator spot, and the subject is required to compensate for these with opposing motions. If the subject does not respond at all, the motion of the indicator is simply the input. If the subject does respond perfectly, the indicator will not move. Clearly, the latter case is almost impossible since there would be no direct signal to the subject that control is required. In this case, the error score is measured by the displacement of the spot from the zero mark.

Secondary, auxiliary, or subsidiary tasks, as they variously have been referred to, have often been used to load or stress a subject while he performs a primary manual control task.

For decades it has been generally acknowledged that performance is degraded when an individual must perform two tasks in a short time interval, i.e., combined performance levels for the two tasks is worse than if each task has been performed singly. Early studies of task loading centered around the idea of a psychological refractory period or a single channel information processing system inherent in the human operator. Many studies looking at unisensory and bisensory tasks ranging from simple discrimination tasks to complex tracking procedures have confirmed the fact that trying to perform two tasks successively or simultaneously can seriously degrade performance on one or both the tasks.

The problem with most secondary loading task experiments has been the ease with which test subjects may trade off errors on either primary or secondary tasks indiscriminantly. Such practices have hindered the interpretation of the effects of overloading since a simple measure of stress effect is impossible under these conditions.

One of the prior testing procedures used the overload concept to study the mental capacity absorbed during driving. This procedure conceded that it is impossible to determine the degree to which a driver is absorbed in his driving by measuring his overt responses directly. However, relatively small changes in his spare 'mental capacity' can be detected by scoring his performance on a subsidiary task, which has no adverse effect upon driving. This technique was sufficiently sensitive to reveal the higher level of concentration required in a shopping area as compared with that required in a residential area. The theoretical basis of the technique is that there is a limit to the rate at which an operator can process information, i.e., 'channel capacity' and when the primary and subsidiary task commands exceed this limit, errors result. The command of the subsidiary task, digit recognition, remained constant. Thus, the increased errors were caused by the increased commands of the primary task of driving through a shopping center where there were more moving vehicles and pedestrians than on the residential course. This is one of the few studies where performance on one task has been held constant while the other was allowed to vary. However, the secondary task was allowed to vary. It might have been more conclusive if the secondary digit task performance were kept constant and the resultant driving performance degradation factor recorded; however, in this instance such a procedure would be highly precarious.

Other time-sharing studies have generally found that performance on two simultaneous tasks degrades from the performance on each separately. Utilizing steering and recognition behavior, the two major aspects of driving, another prior testing procedure found that where time-sharing was required, each type of performance was degraded, and increasing the number of message units appearing in the recognition task increased the time required for recognition of a key message.

In still other task-sharing studies various other variables, e.g., information load of secondary task, rate of presentation, and sense modality utilized have precluded direct comparisons between studies and definitive answers to the problem of the effect of secondary tasks to the primary task.

Another earlier test used three types of secondary tasks (light, sound, and electric current) in three different modes of presentation (simple reaction time, and spatial, and intensity discriminations) with visual pursuit-tracking as the primary task. It was found, in all three cases, that only attention to the visual signals impaired tracking accuracy. This might have been expected since this was the same sensory mode as the primary task. This study, however, could be criticized on the infrequency of presentation of the secondary distractors which were only five per minute.

Other secondary task distractor experiments have had obvious drawbacks. The most serious criticism has already been leveled and that deals with the confounding of performance of primary and secondary tasks. If both are allowed to vary, there is no way to quantify the trade-off interaction aspects. Many studies have presented the distractor at regular intervals which give the subject an anticipatory set.

SUMMARY OF THE INVENTION

This inventive method of psychologic testing provides a means for quantifying the effects of stress on a man's tracking performance. The equipment used in the ZITA method, which is the primary task, has three basic components, the signal processor, the error analyzer and the display/recorder unit. The ZITA equipment provides a one dimensional tracking task for the operator in which he is required to centralize a spot of light in a display window. A display/recorder records control movements, integrated error, and rectified error, and these are permanently recorded. The operating cycle is indefinite, but the integrated error from which the means modular error for each cycle is readily derived, resets to zero in time cycles. The ZITA equipment can be used with various operator control stick devices. The uniqueness of ZITA resides in the fact that there is no external input inherent in the system. The operator has to null only his own error from his previous response which is initially propagated by his first initial response. ZITA, as a primary task or as a sole task, thus provides an unambiguous and reliable task, can accommodate different levels of stress, and has a simple and permanent read out.

The Auditory Discrimination Task (ADT) is intended to provide a simple, standardized psychomotor task which may also be used alone or as a secondary task in combination with the ZITA task to produce "distraction stress" in subjects operating other equipment.

In ADT the subject is provided with head phones and hears sound stimuli, e.g., consisting of a "ping" or a "pong." The first denotes a short pulse of high pitch sound, the latter and equal length pulse of a tone of lower pitch. He responds to the stimuli, which are presented in a random order but at predetermined intervals, by deflecting a "response" stick up or back with his left hand, thus freeing the right hand for the ZITA.

Stimuli, responses, and errors of the ADT are available for simultaneous display on the display/recorder with the ZITA results. Thus, the ADT and the ZITA use the same display/recorder to record performance on both tasks.

BRIEF DESCRIPTION OF THE DRAWING

The single FIG. is a schematic diagram of the equipment in the subject method of psychologic testing.

DESCRIPTION OF THE PREFERRED EMBODIMENT

Referring now to the drawing, the single FIG. shows the complete equipment set up that is necessary to carry out the method of psychologic testing of this invention, and includes a ZITA unit 10, an ADT unit 12, and a display/recorder 14. A control unit 16 is manipulatable by the test subject with his right hand to perform a tracking task on the ZITA unit, while the control unit 18 is manipulatable with the left hand in response to the signals from the ADT unit which are transmitted to the test subject by head phones 20.

The ZITA unit 10, is a compact unit containing all of the necessary equipment to carry out the primary task, which is a tracking task. A screen 22 is the visual presentation to the test subject with a grid line 24 in the center thereof to provide a central or zero position. A light spot 26 is movable in one dimension across the screen 22 and controlled by the test subject via control unit 16. The spot 26 is shown in unbroken lines in a zero position, and in a rightwardly displaced position by phantom line spot 26'. The test subject would then manipulate the control unit 16 to the left in order to move the light spot from its position 26' toward the zero position 26. To make the centering of the spot 26 more difficult and to vary the type of task that may be administered, different types of controllers 16 may be used. The first type of controller that can be used is the standard or "proportional" type which gives a smooth variation of control. A second and preferable type of control that may be used is the "bang-bang" or "switching-type" that has three positions thereon, that of left, zero, or right control settings. With the latter type of switch, the "bang-bang", an additional control 28 is provided on the ZITA unit whereby a switch can be operated to change the "bang-bang" type of switch from a two position, left and right, to a three position, left, zero, and right, type of switch to thereby provide another variable in the tracking function to increase the difficulty thereof.

In addition to the variation of the type of switch that may be used in the controller, and the manner in which its operation may be modified by the switch 28, provision is also made to modify the command execution carried out by the spot 26 in response to stick movement of the controller 16. This further variation is a choice of response either in velocity or acceleration by means of switch 30. For example, if acceleration is the type of control command to be used in a given test, the switch 30 would be turned to the right thereby offering a wide range of "stiffness," which is a measure of angular acceleration, available in this type of test. Similarly, if the control command is to be a function of velocity, the switch 30 is moved to the left. A wide range of lag or lead times may be introduced into the response by moving the switch 34 to the right or left.

The ADT unit 12 is primarily a sound generator producing two sounds, e.g., consisting of a "ping" or a "pong", which are the stimuli to be presented to the test subject. The first, or "ping", denotes a short pulse of high pitch sound, while the latter, or "pong", denotes an equal length pulse of a tone of lower pitch. These sounds are presented to the test subject by means of head phones 20. The test subject is provided with the control unit 18 for the ADT, which requires him to move the stick thereof either forward or backward depending upon which of the sounds have been designated forward or backward. The stimuli of the ADT are presented in a random order but at predetermined intervals, which intervals can be set by interval program means such as a switch 36 or other suitable programmer such as a record. The ADT can normally be set for an interval of 2 seconds between stimuli, but other regular intervals or variable intervals may also be introduced.

The display/recorder 14 can be anyone of a number of commercially available units that provides a graph type of record 38 which provides the display of what the test subject is doing during the course of his tasks, and also provides a permanent record of that task. The ZITA unit 10 and its controller 16 are interconnected with the display/recorder 14 so that when the test subject attempts to tracks the spot 26 properly, the results are recorded on the graph 38. The graph 38 will preferably provide a record of the movement of the stick on the controller 16, the tracking of the spot 26 with respect to the zero grid line 24, the error in the tracking function, and the slope of the integrated error or cumulative error during the course of the performance of the task.

Similarly, the ADT unit 12 is interconnected with the display/recorder 14 so that the subject's manipulation of the switch 18, in response to the sound stimuli, can be presented on the graph 38 with the record of the ZITA test. The graph 38 will preferably record from the ADT test, the input signal or stimuli presented to the test subject, and the test subject's response to the stimuli. Thus, the performance of the test subject with regard to the primary or ZITA task, and the secondary or ADT task can be presented in an easily handled form.

The major components necessary to carry out the method of psychologic testing of this invention have been shown in schematic form since these components are commercially available. The ZITA unit type IIIb is available from Norman K. Walker Associates of Md., the display/recorder is a Honeywell visicorder either type 1406 or 906, and the ADT is available from the Foringer Co. of Md. using modules or as a solid state device from BRS Electronics of Md.

In operation of ZITA, a control system has been employed in which difficulty increased with the mathematical order of the control system which connects the operator's control stick to the display. Therefore, the basic task chosen was "acceleration" control, in which the operator observes a displacement error of the spot of light 26 on the display screen 22, makes a given stick movement on controller 16 to correct it, and observes that the spot accelerates in the direction required to reduce this error. The "acceleration" control system is considered to be adequately difficult to detect the effects of stress. Previous experiments indicate that the effect of stress is difficult to detect if a task is too easy, and that as the task is made more difficult, the effect of stress becomes more apparent.

Since it is believed that fundamentally a test subject responds to the angular error when he is tracking, the error is expressed in milliradians, a nondimensional unit which is more basic than measuring an angle in degrees. The spot of light 26 is considered to be a point and the response of the spot is defined by the angular acceleration of the line of sight caused by a fixed stick movement. This is called the control "stiffness." Because the measurements are concerned with angles, the stiffness can be varied either by changing the electronic gain or the optical magnification of the system.

In order to permit precise training, the tracking task of the ZITA is simplified by having the test subject continually correct an error produced by his own control input. The difficulty of defining the correct response encountered when using the proportional control stick was eliminated by using a "bang-bang" control stick for the control 16 of the ZITA. This will give only three control positions—maximum left, zero, and maximum right. Since the center zero position is not used by skilled operators, it is normally removed by so changing the switch 28 on the ZITA panel. Then the test subject has only two control positions, left and right, and he is forced to oscillate his control stick. The spot 26 moves to the left with a left stick movement and the stick must be moved to the right to prevent the spot from overshooting the desired position. The stick movements are continual and a subject can be quickly trained to a plateau level by using a particular tracking technique called "Rubric" tracking. According to this technique, the subject must reverse control when the spot is half way back to the desired central position 24 on the screen 22. This gives an immediate correction for odd large errors that occur when the tracking task has acceleration control, but no lag. When different tasks are used, other rules tell the subject when to reverse control. For instance, when the control has lag time, but no acceleration, control must be reversed immediately after the spot reaches the peak of its movement because there is a time delay between stick movement and command execution. The test subject must be briefly taught the rules for the particular tracking task, e.g., the "Rubric" technique.

Results show that the plateau level attained by individuals of similar ages and vision and using the "Rubric" tracking technique is substantially constant. Other techniques of tracking, such as "oscillatory" in which the subject vibrates the stick as rapidly as possible, and "flick" tracking, have been investigated, but the "Rubric" method gives the most consistent results.

A set of results for one skilled subject on a task, which has acceleration control and no lag, over the entire available stiffness range shows that at high stiffnesses the error is proportional to the stiffness, which indicates that the subject is responding to a stimulus and moving the stick as fast as possible. At lower stiffnesses, the error tends to a constant value, which is the minimum error the subject can appreciate as requiring a response. This slows down the rate of stick commands, since the subject must wait for an appreciable error to build up. The shape of the curve is consistent and does not vary over time.

The tracking task could be made more difficult by adding an additional stage of integration, but experiments showed that this was too difficult to produce useful results. Instead, an increase in task difficulty was achieved by adding a lag to delay the effect of applying a control signal. Tests have shown that a lagged system seems more difficult to the operator, produces a considerably larger base error for a given stiffness, and is more affected by stress. Furthermore, the effect of the stress is roughly independent of the control stiffness, but varies with the amount of lag.

The ADT requires the test subject to pay attention to an auditory stimulus and make a manual response, thereby providing a simple, standardized psychomotor task which may be used alone or as a secondary task to produce "distraction stress" to a subject operating other equipment such as ZITA.

The subject is provided with head phones 20 and hears stimuli consisting of the aforementioned "ping" or "pong" from the unit 12. He responds to the stimuli, which may be presented in a random order and at predetermined intervals, by deflecting the "response" stick of the control unit 18 with his left hand, his right hand being for the ZITA controller 16.

These responses are fed back to the ADT and scored according to the following rules:
1. Correct response to stimulus—no error.
2. Incorrect response to stimulus—one error.
3. No response to stimulus before next stimulus is presented—one error.
4. Multiple responses to one stimulus—scored according to first response. All later responses ignored. They are not counted as correct responses or as errors.

The stimuli, responses, and errors are, as set forth above, displayed on the display/recorder graph 38.

The ADT is intended primarily for use as a secondary stressor task to the ZITA tracking device, but as can be seen, is readily adaptable for use as a single or primary task. The ADT may be set for an interval of 2 seconds between stimuli but other regular intervals or variable intervals may also be used, with a comparatively low rate of one stimulus per second producing severe distraction of tracing performance in many subjects.

Other further useful features can readily be made available on the ADT with minor changes of component assemblies. These are:
a. The provision of "Punishment" for ADT errors to the tracking device as disturbance inputs, (hence the subject is unable to obtain good tracking performance by ignoring the ADT stimuli), or by advising the student and instructor of errors by electric shocks, flashing lights etc.
b. The triggering of the ADT stimuli from present conditions of the tracking task error rather than from the fixed time interval programmer. (This enables the experimentor to investigate the conditions for maximum possible disruption of tracking performance).
c. The provision of a variable spacing between stimuli to simulate rapidly changing operational conditions.
d. The modification to rule 3 so that the interval in which a correct response is selected is less than the spacing between stimuli.
e. For stress sensitive subjects a simple form of ADT has been used in which there is only one type of stimulus, and the subject merely signals that he has received it.

As can be seen from the above, the ZITA provides a primary task which is the important task and must be completed by the test subject with the best possible accuracy. The ADT provides a distraction stress task for the test subject and must also be completed with the highest possible accuracy, but nonetheless is a secondary task. The use to which this combined psychologic testing method can be put is graphically illustrated in the training of military pilots. The primary object of a military flight, for the purposes of this example a bombing mission against a target, is for the pilot to navigate his airplane to the target area and to deliver his ordnance on the target. The pilot must of course achieve this at all cost, but on route to the target and in the target area would usually be found surface to air missile launching sites which would intrude upon the pilot's concentration on his primary task and, to a certain extent, degrade the accomplishment of such primary task. Also, as can be seen, while the presence of the surface to air missile sites is secondary to the striking of the target, the pilot nonetheless must be aware of the missile sites and be prepared to perform evasive maneuvers should his warning system signal the approach of a surface to air missile. From this can be seen the analogy wherein the ZITA represents the pilot's primary task on his bombing mission of delivery of ordnance to a target, with the ADT providing the distracting influence that is normally provided by the knowledge of the presence of surface to air missile sites. In this way, it is possible to evaluate the performance of prospective pilots or pilot trainees to determine how they will react under such conditions as an actual bombing run will present, without actually putting a pilot through the complete training program and then finding that he cannot perform under such conditions of stress.

The method of testing of this invention provides unusual and unexpected results in that the results are comparable to a much higher degree than any prior known or used tests. Thus, not only may individual subjects be rated and compared, but the difficulty of a particular task may be rated against a norm.

While the manipulation of the control units 18 and 16, of the ADT and ZITA respectively, have been set forth as hand operations, it is understood that these units may be operated by other motor responses. For example, the test subjects hands could be occupied by a manual task with the control units being operated by the feet. Further difficulty of performance could be introduced by a combination of hand and foot manipulation of the control units.

I claim:
1. A method for measuring the performance of a human operator, or the difficulty of a task to be performed by a human operator, or distracting effects of surrounding environment, comprising:
   a. providing a movable and visible tracking spot and a reference position therefor;
   b. causing movement of the spot solely in response to application or control commands from a human operator, whereby there is no other deliberate input causing movement of the spot;
   c. providing an auditory stimuli of at least two different tones;
   d. supplying a different control response from a human operator for each tone;
   e. varying the order of presentation of the tones; and
   f. displaying and recording the above steps for comparison therebetween.

2. The method of claim 1 further comprising the step of varying the response of movement of the tracking spot to the control commands.

3. The method of claim 2 wherein the varying of the control command includes accelerating the movement of the tracking spot in response to the control command.

4. The method of claim 3 further comprising delaying the movement of the tracking spot in response to the control command.

5. The method of claim 1 further comprising limiting the control commands to a complete off and on function.

6. The method of claim 1 wherein the displaying and recording includes the control commands, the movement of the tracking spot, the error between the location of the spot and the reference position therefor, the tones presented, and the control response to the tones.

7. A method for measuring the performance of a human operator, or the difficulty of a task to be performed by a human operator, or distracting effects of surrounding environment, comprising:
   a. providing a visible movable tracking spot and a reference position therefor;
   b. applying control commands from a human operator to cause movement of the tracking spot solely from the input supplied by the human operator, whereby there is no other deliberate input causing movement of the spot;
   c. varying the response of the control spot to the control commands and
   d. displaying and recording the control commands, the location of a tracking spot, and the error between the tracking spot and the reference position therefor.

8. The method of claim 7 wherein the response of the tracking spot to the control commands is varied by acceleration and time lag.